(12) United States Patent
Wu (10) Patent No.: US 10,991,282 B2
(45) Date of Patent: Apr. 27, 2021

(54) LIGHT UP CONTROL SYSTEM BOARD, DETECTION METHOD, AND LIGHT UP DETECTION DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Guoqiang Wu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/334,066

(22) PCT Filed: Aug. 6, 2018

(86) PCT No.: PCT/CN2018/099015
§ 371 (c)(1),
(2) Date: Mar. 18, 2019

(87) PCT Pub. No.: WO2019/029490
PCT Pub. Date: Feb. 14, 2019

(65) Prior Publication Data
US 2019/0251886 A1    Aug. 15, 2019

(30) Foreign Application Priority Data
Aug. 7, 2017 (CN) .......................... 201710666256.X (51) Int. Cl.
*G09G 3/00* (2006.01)
*G09G 3/20* (2006.01)
*G02F 1/13* (2006.01)

(52) U.S. Cl.
CPC ........... *G09G 3/006* (2013.01); *G02F 1/1309* (2013.01); *G09G 3/2096* (2013.01);
(Continued)

(58) Field of Classification Search
CPC .... G02F 1/1309; G09G 3/006; G09G 3/2096; G09G 2310/08; G09G 2330/026; G09G 2330/04
See application file for complete search history.

(56) References Cited

U.S. PATENT DOCUMENTS

| 2011/0022287 A1* | 1/2011 | Krauter | G05B 19/0428 |
| | | | 701/103 |
| 2016/0117964 A1* | 4/2016 | Chen | G01R 31/31724 |
| | | | 324/750.3 |
| 2019/0251886 A1 | 8/2019 | Wu | |

FOREIGN PATENT DOCUMENTS

| CN | 201383676 Y | 1/2010 |
| CN | 202150247 U | 2/2012 |

(Continued)

OTHER PUBLICATIONS

International Search Report and Written Opinion dated Nov. 6, 2018; PCT/CN2018/099015.

*Primary Examiner* — Alexander Eisen
*Assistant Examiner* — Nathaniel P Brittingham (57) ABSTRACT

A light up control system board, including a system board which includes: a main control module, a control transfer module and a voltage generation module; the main control module outputs a plurality of voltage generation signals so as to control the voltage generation module to determine a voltage value of a corresponding light up voltage; by means of the control transfer module, generating enabling signals corresponding to each voltage generating signal and outputting the same to the voltage generating module; the enabling signals starting power up in the system board, and having (Continued)

invalid potential during a time duration used until power up is complete; the voltage generation module being output-free under the control of the invalid potential of the enabling signals, and outputting a light up voltage to a display panel under the control of a valid potential of the enabling signals.

20 Claims, 5 Drawing Sheets

(52) U.S. Cl.
CPC ... *G09G 2310/08* (2013.01); *G09G 2330/026* (2013.01); *G09G 2330/04* (2013.01)

(56) References Cited

FOREIGN PATENT DOCUMENTS

| | | | |
|---|---|---|---|
| CN | 204405990 U | * | 6/2015 |
| CN | 204405990 U | | 6/2015 |
| CN | 105486963 A | | 4/2016 |
| CN | 105807456 A | | 7/2016 |
| CN | 107402460 A | | 11/2017 |
| JP | 2007-140130 A | | 6/2007 |
| KR | 1020090046130 A | | 5/2009 |

* cited by examiner

FIG. 6 the main control module outputting the plurality of voltage generating signals to the voltage generating module, and outputting the first control signals in one-to-one correspondence with the plurality of voltage generating signals and the second control signals in one-to-one correspondence with the plurality of voltage generating signals to the transformation control module the transformation control module generating the enabling signals corresponding to the plurality of voltage generating signals under the common control of the first control signals and the second control signals corresponding to the plurality of voltage generating signals, wherein each of the enabling signals is of an invalid potential within a period of time from beginning of power-on to completion of power-on for the light-on control system board the voltage generating module determining values of corresponding light-on voltages under the control of the plurality of voltage generating signals, and outputs the corresponding light-on voltages of the values being determined to the display panel under the control of a valid potential of the enabling signals corresponding to the plurality of voltage generating signals being received

FIG. 7

LIGHT UP CONTROL SYSTEM BOARD, DETECTION METHOD, AND LIGHT UP DETECTION DEVICE

The present application claims priority to Chinese patent application No. 201710666256.X, filed on Aug. 7, 2017, the entire disclosure of which is incorporated herein by reference as part of the present application.

TECHNICAL FIELD

Embodiments of the present disclosure relate to a light-on control system board, an inspection method and a light-on test device.

BACKGROUND

In the process of production and preparation for a display panel, a light-on test on the display panel is generally performed by a light-on test device, so as to inspect whether the display panel has a dead pixel (for example, a bright pixel or a dark pixel), and the light-on test device usually works under the control of a light-on control system board.

SUMMARY

Embodiments of the present disclosure provide a light-on control system board, an inspection method and a light-on test device, which are used to solve the problem in the related art, that because EN terminals of a programmable circuit are of a high potential when the light-on test device is powered on, light-on voltages outputted to the display panel are uncontrollable, which results in that a current inputted to the display panel is too large, and the display panel is damaged and cannot be lit on.

At least an embodiment of the present disclosure provides a light-on control system board, which is applied in a light-on test device for inspection of a display panel; the light-on control system board comprises: a main control module, a transformation control module and a voltage generating module;

the main control module is configured to output a plurality of voltage generating signals to the voltage generating module, and output first control signals in one-to-one correspondence with the plurality of voltage generating signals and second control signals in one-to-one correspondence with the plurality of voltage generating signals to the transformation control module;

the transformation control module is configured to generate enabling signals corresponding to the plurality of voltage generating signals under common control of the first control signals and the second control signals which are received and correspond to the plurality of voltage generating signals, and output the enabling signals being generated to the voltage generating module, wherein each of the enabling signals is of an invalid potential within a period of time from beginning of power-on to completion of power-on for the light-on control system board;

the voltage generating module is configured to determine values of corresponding light-on voltages under the control of the plurality of voltage generating signals being received, and output the corresponding light-on voltages of the values being determined to the display panel under the control of a valid potential of the enabling signals corresponding to the plurality of voltage generating signals being received.

In an embodiment of the present disclosure, the transformation control module comprises: first transformation control sub-modules in one-to-one correspondence with the first control signals and second transformation control sub-modules in one-to-one correspondence with the second control signals; wherein a first terminal of each of the first transformation control sub-modules is correspondingly connected to the main control module, and configured to receive a corresponding first control signal; a second terminal of each of the first transformation control sub-modules is connected to a reference voltage terminal, and configured to receive a reference voltage signal; an output terminal of each of the first transformation control sub-modules is connected to a second terminal of a corresponding second transformation control sub-module; each of the first transformation control sub-modules is configured to output a corresponding delay signal to the corresponding second transformation control sub-module under the control of the first control signal being received; the delay signal is a signal after delaying the reference voltage signal corresponding to a valid potential of the first control signal being received by a preset delay time;

a first terminal of each of the second transformation control sub-modules is correspondingly connected to the main control module, and configured to receive a corresponding second control signal; an output terminal of each of the second transformation control sub-modules is correspondingly connected to the voltage generating module, and configured to output a corresponding enabling signal; each of the second transformation control sub-modules is configured to receive the corresponding second control signal and the corresponding delay signal, and output the corresponding enabling signal to the voltage generating module under the control of the second control signal being received; the enabling signal is a delay signal corresponding to a valid potential of the second control signal being received.

In an embodiment of the present disclosure, each of the first transformation control sub-modules comprises a delay buffer, the preset delay time is a delay time of the delay buffer, an enabling terminal of the delay buffer serves as the first terminal of each of the first transformation control sub-modules, an input terminal of the delay buffer serves as the second terminal of each of the first transformation control sub-modules, an output terminal of the delay buffer serves as the output terminal of each of the first transformation control sub-modules.

In an embodiment of the present disclosure, each of the second transformation control sub-modules comprises a control buffer, an enabling terminal of the control buffer serves as the first terminal of each of the second transformation control sub-modules, an input terminal of the control buffer serves as the second terminal of each of the second transformation control sub-modules, an output terminal of the control buffer serves as the output terminal of each of the second transformation control sub-modules.

In an embodiment of the present disclosure, the main control module comprises a micro processing chip;

a first output terminal of the micro processing chip is correspondingly connected to the transformation control module, and configured to output the first control signals; a second output terminal of the micro processing chip is correspondingly connected to the transformation control module, and configured to output the second control signals; a third output terminal of the micro processing chip is correspondingly connected to the voltage generating module, and configured to output the voltage generating signals.

In an embodiment of the present disclosure, the voltage generating module comprises a programmable circuit;

an enabling terminal of the programmable circuit is correspondingly connected to the transformation control module, and configured to receive the enabling signals; a first input terminal of the programmable circuit is correspondingly connected to the main control module, and configured to receive the voltage generating signals; an output terminal of the programmable circuit is correspondingly connected to the display panel, and configured to output the light-on voltages.

In an embodiment of the present disclosure, the light-on control system board further comprises: a voltage transformation module;

the voltage transformation module is configured to transform a power supply voltage into an operation voltage for the main control module, the transformation control module and the voltage generating module, and output the operation voltage;

the main control module, the transformation control module, and the voltage generating module are further configured to receive the operation voltage.

In an embodiment of the present disclosure, in the light-on control system board, the voltage transformation module comprises: a step-down transformation circuit;

an input terminal of the step-down transformation circuit is connected to a power supply terminal, and configured to receive the power supply voltage; an output terminal of the step-down transformation circuit is respectively connected to the main control module, the transformation control module, and the voltage generating module, and configured to output the operation voltage.

In an embodiment of the present disclosure, in the light-on control system board, upon the main control module comprising a micro processing chip, an input terminal of the micro processing chip is connected to the voltage transformation module, and configured to receive the operation voltage; or, upon the transformation control module comprising a first transformation control sub-module and a second transformation control sub-module, the reference voltage terminal is connected to the voltage transformation module, and configured to receive the operation voltage; or, upon the voltage generating module comprising a programmable circuit, a second input terminal of the programmable circuit is connected to the voltage transformation module, and configured to receive the operation voltage.

In an embodiment of the present disclosure, in the light-on control system board, the main control module is further configured to generate a data voltage signal for lighting on the display panel, and output the data voltage signal being generated to the display panel through a mobile industry processor interface.

In an embodiment of the present disclosure, in the light-on control system board, the main control module outputs the first control signals and the second control signals through an input/output interface.

In an embodiment of the present disclosure, in the light-on control system board, the main control module outputs the voltage generating signals through a serial peripheral interface or a serial communication bus.

At least an embodiment of the present disclosure also provides a light-on test device, which comprises the light-on control system board provided by any one embodiment of the present disclosure.

At least an embodiment of the present disclosure also provides an inspection method for the light-on control system board provided by any one embodiment of the present disclosure, which comprises:

the main control module outputting the plurality of voltage generating signals to the voltage generating module, and outputting the first control signals in one-to-one correspondence with the plurality of voltage generating signals and the second control signals in one-to-one correspondence with the plurality of voltage generating signals to the transformation control module;

the transformation control module generating the enabling signals corresponding to the plurality of voltage generating signals under the common control of the first control signals and the second control signals corresponding to the plurality of voltage generating signals, wherein each of the enabling signals is of an invalid potential within a period of time from beginning of power-on to completion of power-on for the light-on control system board;

the voltage generating module determining values of corresponding light-on voltages under the control of the plurality of voltage generating signals, and outputs the corresponding light-on voltages of the values being determined to the display panel under the control of a valid potential of the enabling signals corresponding to the plurality of voltage generating signals being received.

In an embodiment of the present disclosure, wherein, upon the transformation control module comprising first transformation control sub-modules in one-to-one correspondence with the first control signals and second transformation control sub-modules in one-to-one correspondence with the second control signals, generating the enabling signals corresponding to the plurality of voltage generating signals under the common control of the first control signals and the second control signals corresponding to the plurality of voltage generating signals, comprises:

each of the first transformation control sub-modules outputting a corresponding delay signal to a corresponding second transformation control sub-module under the control of the first control signal being received; wherein the delay signal being a signal after delaying a reference voltage signal corresponding to a valid potential of the first control signal being received by a preset delay time;

each of the second transformation control sub-modules outputting the corresponding enabling signal to the voltage generating module under the control of the second control signal being received; wherein the enabling signal is a delay signal corresponding to a valid potential of the second control signal being received.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

FIG. 3a is a schematic structural diagram further illustrating the light-on control system board shown in FIG. 2a;

FIG. 4a is a circuit schematic diagram of the light-on control system board shown in FIG. 3a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
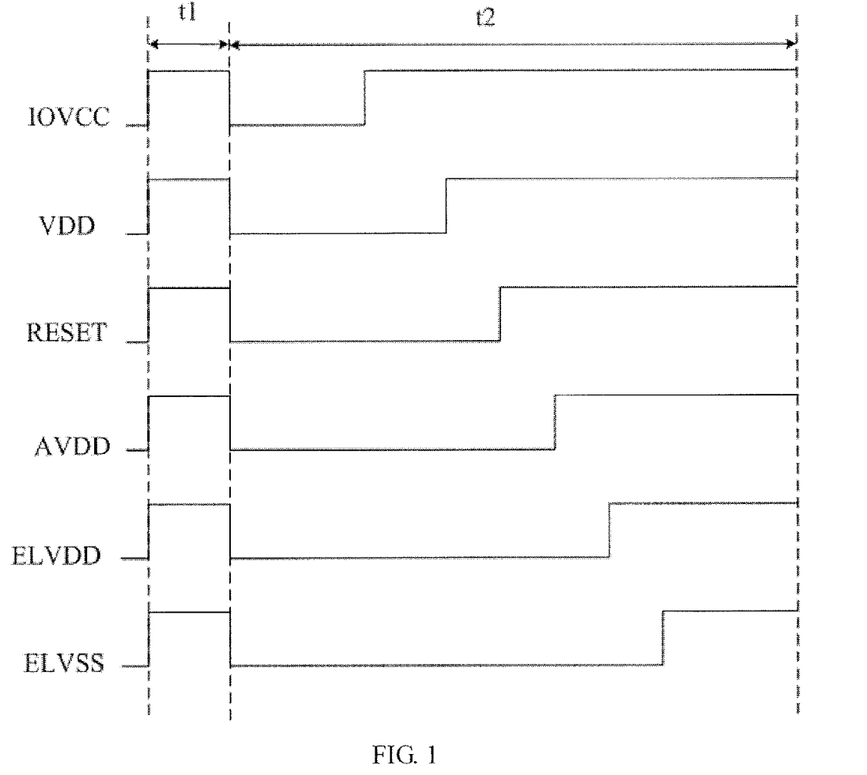
FIG. 1 is a timing diagram of light-on voltages outputted by a light-on test device in the related art.

A light-on control system board in the related art comprises: a main control integrated circuit (IC) and a programmable circuit. Among them, pins of the main control IC are connected to pins of the programmable circuit directly and correspondingly. For example, each EN terminal of the main control IC is connected to each EN terminal of the programmable circuit directly and correspondingly. As shown in FIG. 1, during a normal working time t2 of a light-on test device, the main control IC inputs corresponding enabling signals to the programmable circuit through the connected EN terminals, so as to control the programmable circuit to output a plurality of light-on voltages, such as IOVCC, VDD, RESET, AVDD, ELVDD, ELVSS, etc., at a predetermined timing. Among them, IOVCC is a voltage applied for driving an input/output (I/O) interface chip in a driver chip of a display panel, VDD is a power supply voltage applied for maintaining the operation of the driver chip, RESET is a reset voltage for resetting the driver chip, AVDD is an analog voltage for enabling the driver chip to output a corresponding signal, and ELVDD and ELVSS are respectively a high voltage and a low voltage for controlling light emission of a pixel in a display region.

However, when the light-on test device is powered on, since the power supply voltage is instantaneously supplied to the light-on control system board, the light-on control system board will instantaneously transform the power supply voltage being inputted and supply to the main control IC, making all the pins of the main control IC become of a high potential uncontrollably and instantaneously. Since the EN terminals of the main control IC are directly connected to the EN terminals of the programmable circuit, the EN terminals of the programmable circuit also become of a high potential at a power-on instant t1, which results in that the light-on voltages IOVCC, VDD, RESET, AVDD, ELVDD, and ELVSS, outputted by the programmable circuit are all of a high potential, as shown in FIG. 1. Therefore, the programmable circuit output the uncontrollable light-on voltages to the display panel at the power-on instant t1, and then a current inputted to the display panel is too large, which results in that the display panel is damaged and cannot be lit on.

At least an embodiment of the present disclosure provides a light-on control system board, which can prevent the light-on control system board from outputting light-on voltages having an uncontrollable timing when the light-on control system is powered on, and can effectively control the light-on voltages outputted to the display panel, and improve the stability of inspection of the display panel.

Figure 2A:
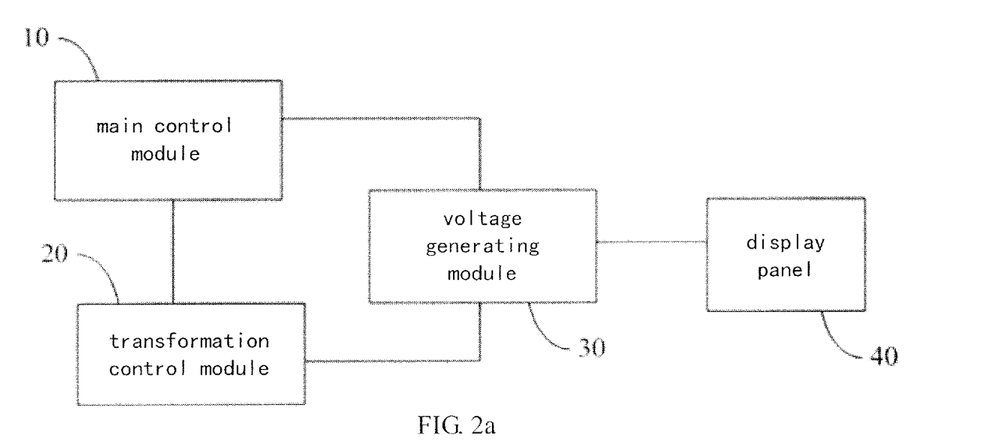
FIG. 2a is a schematic structural diagram of a light-on control system board according to an embodiment of the present disclosure.

At least an embodiment of the present disclosure provides a light-on control system board, which is applied in a light-on test device for inspection of a display panel; the light-on control system board, as shown in FIG. 2a, comprises: a main control module 10, a transformation control module 20 and a voltage generating module 30.

The main control module 10 is configured to output a plurality of voltage generating signals to the voltage generating module 30, and output first control signals in one-to-one correspondence with the plurality of voltage generating signals and second control signals in one-to-one correspondence with the plurality of voltage generating signals to the transformation control module 20.

The transformation control module 20 is configured to generate enabling signals corresponding to the plurality of voltage generating signals under common control of the first control signals and the second control signals which are received and correspond to the plurality of voltage generating signals, and output the enabling signals being generated to the voltage generating module 30, wherein each of the enabling signals is of an invalid potential within a period of time from beginning of power-on to completion of power-on for the light-on control system board.

The voltage generating module 30 is configured to determine values of corresponding light-on voltages under the control of the plurality of voltage generating signals being received, and output the corresponding light-on voltage of the values being determined to the display panel 40 under the control of a valid potential of the enabling signals corresponding to the plurality of voltage generating signals being received.

In the light-on control system board according to the embodiment of the present disclosure, the main control module outputs the plurality of voltage generating signals to the voltage generating module to control the voltage generating module to determine values of corresponding light-on voltages, that is, the main control module inputs the plurality of voltage generating signals directly to the voltage generating module to control the voltage generating module to determine values of corresponding light-on voltages. The main control module outputs the first control signals in one-to-one correspondence with the plurality of voltage generating signals and the second control signals in one-to-one correspondence with the plurality of voltage generating signals to the transformation control module, the transformation control module generates the enabling signals corresponding to the plurality of voltage generating signals under the common control of the first control signals and the second control signals which are received and correspond to the plurality of voltage generating signals, and outputs the enabling signals being generated to the voltage generating module, wherein each of the enabling signals being generated is of an invalid potential within a period of time from beginning of power-on to completion of power-on for the light-on control system board, so that the voltage generating module has no output under the control of an invalid potential of the enabling signals, and the voltage generating module outputs the corresponding light-on voltages of the values being determined under the control of a valid potential of the enabling signals. Therefore, each of the enabling signals inputted by the transformation control module controlled by the main control module to the voltage generating module is of an invalid potential within a period of time from beginning of power-on to completion of power-on for the light-on control system board, which can prevent the light-on control system board from outputting light-on voltages having an uncontrollable timing when the light-on control system is powered on, and can effectively control the light-on voltages outputted to the display panel, improve the stability of inspection of the display panel, and make the control of the light-on control system board smarter.

For example, in the aforementioned light-on control system board according to the embodiment of the present disclosure, upon each of the enabling signals being of an invalid potential, each of the light-on voltages outputted by the voltage generating module is of an invalid potential, and when the light-on voltages of an invalid potential are inputted to the display panel, the display panel will not be lit on. Upon each of the enabling signals being of a valid potential, each of the light-on voltages outputted by the voltage generating module is a voltage with a determined value, and when the light-on voltages with the determined values are inputted to the display panel, the display panel will be lit on normally, so that the display panel being lit on can be inspected. For example, the invalid potential of an enabling signal can be of a low potential, and the valid potential thereof can be of a high potential.

An organic light-emitting display panel has the advantages of low power consumption, low production cost, self-illumination, wide viewing angle and fast response speed. Therefore, it has been widely used in display fields such as mobile phones, tablet computers, and digital cameras, etc. For example, the display panel inspected by the light-on control system board described above according to the embodiment of the present disclosure may be an organic light-emitting display panel. In the organic light-emitting display panel, generally, a driver chip in the organic light-emitting display panel drives pixels in a display region to realize an image display function. For example, the light-on voltages outputted by the voltage generating module can comprise: IOVCC, VDD, RESET, AVDD, ELVDD, ELVSS, etc. For example, each of the light-on voltages is a voltage of an analog signal, and one enabling signal controls a corresponding one of the light-on voltages. Moreover, for example, voltages inputted to the driver chip and the display region in the display panel can further comprise a variety of voltages, which should be comprised in those voltages for the driver chip and the display region in the display panel as understood by those skilled in the art, without being repeatedly described herein.

Figure 2B:
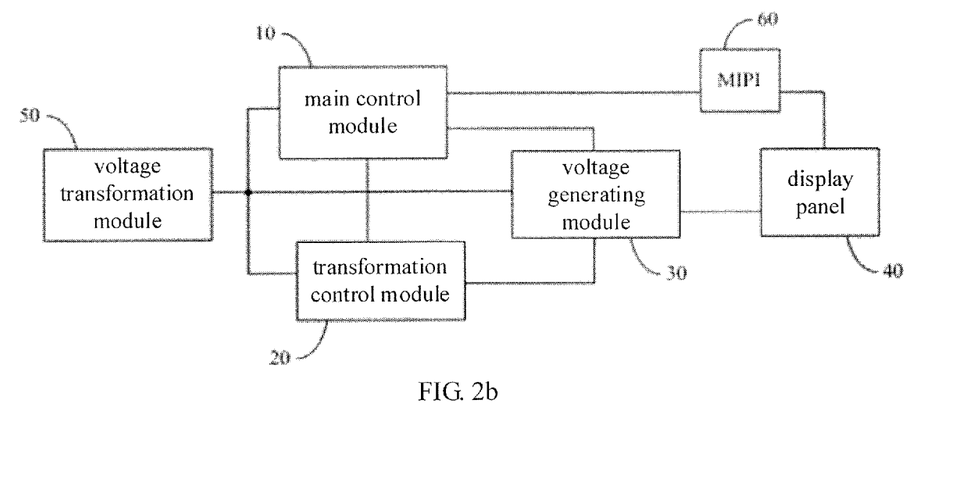
FIG. 2b is a schematic structural diagram of a light-on control system board according to another embodiment of the present disclosure.

For example, in the light-on control system board according to the embodiment of the present disclosure, as shown in FIG. 2b, the main control module 10 is further configured to generate a data voltage signal for lighting on the display panel 40, and output the data voltage signal to the display panel 40 through a mobile industry processor interface (MIPI) 60. The data voltage signal is a digital signal, and the data voltage signal for displaying an image is transmitted to the driver chip in the display panel by using the MIPI.

For example, in the light-on control system board according to the embodiment of the present disclosure, the main control module outputs the first control signals and the second control signals through the input/output (I/O) interface.

For example, in the light-on control system board according to the embodiment of the present disclosure, the main control module outputs voltage signals through a serial peripheral interface (SPI) or an inter-integrated circuit (I2C).

Figure 3A:
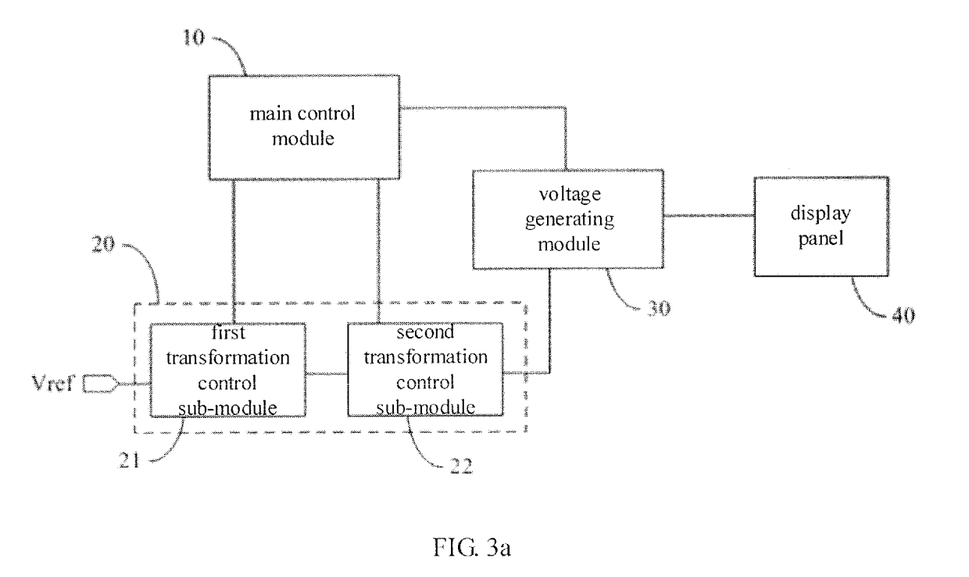
Figure 3B:
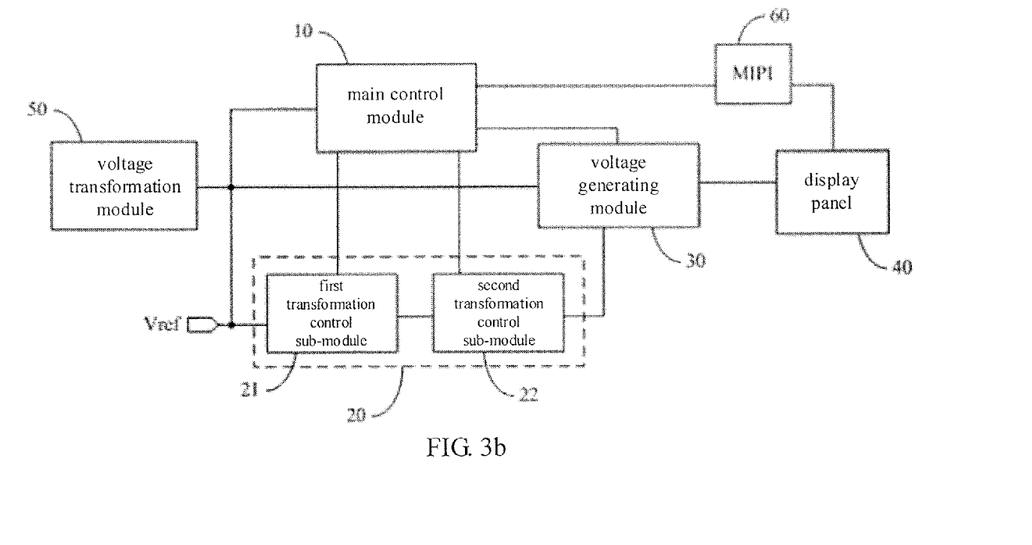
FIG. 3b is a schematic structural diagram further illustrating the light-on control system board shown in FIG. 2b.

For example, in the light-on control system board according to an embodiment of the present disclosure, as shown in FIG. 3a and FIG. 3b (both FIG. 3a and FIG. 3b comprise a first transformation control sub-module and a second transformation control sub-module as an example), the transformation control module 20 can comprise: first transformation control sub-modules 21 in one-to-one correspondence with the first control signals and second transformation control sub-modules 22 in one-to-one correspondence with the second control signals.

A first terminal of each of the first transformation control sub-modules 21 is correspondingly connected to the main control module 10, and configured to receive a corresponding first control signal; a second terminal of each of the first transformation control sub-modules 21 is connected to a reference voltage terminal Vref, and configured to receive a reference voltage signal; an output terminal of each of the first transformation control sub-modules 21 is connected to a second terminal of a corresponding second transformation control sub-module 22; each of the first transformation control sub-modules 21 is configured to output a corresponding delay signal to the corresponding second transformation control sub-module 22 under the control of the first control signal being received; the delay signal is a signal after delaying the reference voltage signal corresponding to a valid potential of the first control signal being received by a preset delay time; a first terminal of each of the second transformation control sub-modules 22 is correspondingly connected to the main control module 10, and configured to receive a corresponding second control signal; an output terminal of each of the second transformation control sub-modules 22 is correspondingly connected to the voltage generating module 30, and configured to output a corresponding enabling signal; each of the second transformation control sub-modules 22 is configured to receive the corresponding second control signal and the corresponding delay signal, and output the corresponding enabling signal to the voltage generating module 30 under the control of the second control signal being received; the enabling signal is a delay signal corresponding to a valid potential of the second control signal being received.

For example, in the light-on control system board according to the embodiment of the present disclosure, the valid potential of the first control signals and the valid potential of the second control signals can be of a high potential.

For example, in the light-on control system board according to the embodiment of the present disclosure, as shown in FIG. 2b and FIG. 3b, the light-on control system board further comprises: a voltage transformation module 50.

The voltage transformation module 50 is configured to transform a power supply voltage into an operation voltage for the main control module 10, the transformation control module 20 and the voltage generating module 30, and output the operation voltage.

The main control module 10, the transformation control module 20, and the voltage generating module 30 are further configured to receive the operation voltage. In this way, the operation voltage is provided to the main control module 10, the transformation control module 20 and the voltage generating module 30 by the voltage transformation module, so as to maintain the normal operation of the main control module 10, the transformation control module 20 and the voltage generating module 30.

Functions of the light-on control system board required by different types of display panels are different. For example, in the light-on control system board according to the embodiment of the present disclosure, at the completion of power-on for the light-on control system board, the operation voltage outputted to each module in the light-on control system board can be regarded as being in a stable state, so that each module can begin to work stably under the operation voltage being inputted. In the present disclosure, the operation voltage being in a stable state, means that the fluctuation of the operation voltage can be neglected within the range of error tolerance. And the period of time required by the light-on control system board from the beginning of power-on to the completion of power-on is determined according to the situation of an actual application, which is not limited herein.

The present disclosure will be described in detail below with reference to the embodiments. It should be noted that the description of the embodiments is for a better understanding of the present disclosure and should not be construed as a limitation to the present disclosure.

Figure 4A:
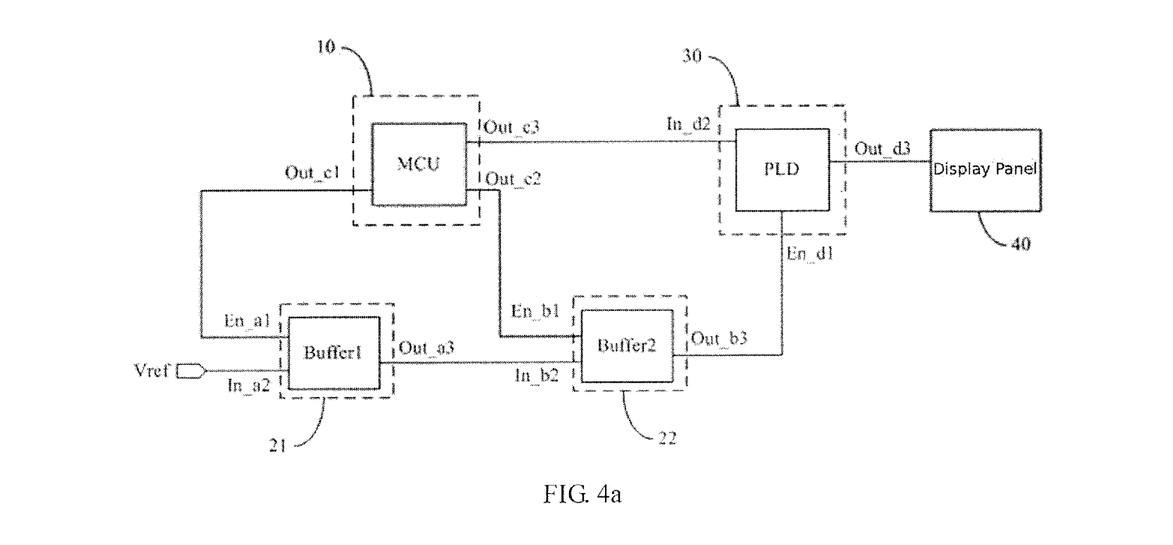
Figure 4B:
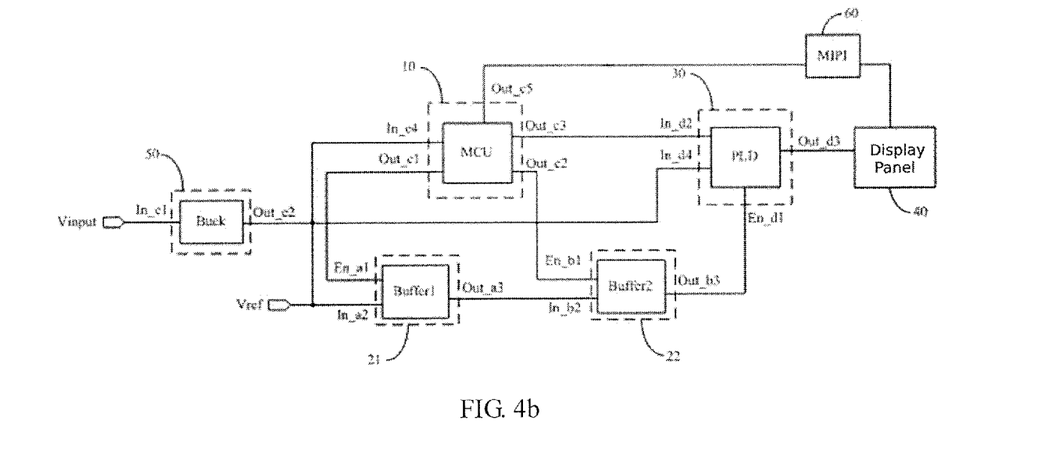
FIG. 4b is a circuit schematic diagram of the light-on control system board shown in FIG. 3b.

For example, in the light-on control system board according to an embodiment of the present disclosure, as shown in FIG. 4a and FIG. 4b, each of the first transformation control sub-modules 21 comprises: a delay buffer Buffer1; the preset delay time is a delay time of the delay buffer.

An enabling terminal En_a1 of the delay buffer Buffer1 serves as the first terminal of each of the first transformation control sub-modules 21, an input terminal In_a2 of the delay buffer Buffer1 serves as the second terminal of each of the first transformation control sub-modules 21, an output terminal Out_a3 of the delay buffer Buffer1 serves as the output terminal of each of the first transformation control sub-modules 21.

For example, in the light-on control system board according to the embodiment of the present disclosure, the delay buffer has the preset delay time, and the delay buffer can delay a signal of the input terminal thereof by the preset delay time upon the potential of the enabling terminal thereof being of a high potential, and output the signal being delayed through the output terminal thereof; and upon the potential of the enabling terminal thereof being of a low potential, the output terminal thereof has no output.

For example, in the light-on control system board according to the embodiment of the present disclosure, the preset delay time of the delay buffer can be 200 ms; or can be 300 ms; or can be set according to actual requirements. Moreover, the structure of the delay buffer having the delay function can be any structure that can be understood by those skilled in the art, which is not repeatedly described herein. Nor should it be construed as a limitation to the present disclosure.

For example, in the light-on control system board according to the embodiment of the present disclosure, as shown in FIG. 4a and FIG. 4b, each of the second transformation control sub-modules 22 can comprise a control buffer Buffer2.

An enabling terminal En_b1 of the control buffer Buffer2 serves as the first terminal of each of the second transformation control sub-modules 22, an input terminal In_b2 of the control buffer Buffer2 serves as the second terminal of each of the second transformation control sub-modules 22, an output terminal Out_b3 of the control buffer Buffer2 serves as the output terminal of each of the second transformation control sub-modules 22.

For example, in the light-on control system board according to the embodiment of the present disclosure, the control buffer can output a signal of the input terminal thereof through the output terminal thereof; upon the potential of the enabling terminal thereof being of a high potential; and upon the potential of the enabling terminal thereof being of a low potential, the output terminal thereof has no output.

For example, in the light-on control system board according to the embodiment of the present disclosure, the structure of the control buffer can be any structure that can be understood by those skilled in the art, which is not repeatedly described herein. Nor should it be construed as a limitation to the present disclosure.

For example, in the light-on control system board according to the embodiment of the present disclosure, as shown in FIG. 4a and FIG. 4b, the main control module 10 comprises a micro processing chip MCU.

A first output terminal Out_c1 of the micro processing chip MCU is correspondingly connected to the transformation control module, and configured to output the first control signals; a second output terminal Out_c2 of the micro processing chip MCU is correspondingly connected to the transformation control module, and configured to output the second control signals; a third output terminal Out_c3 of the micro processing chip MCU is correspondingly connected to the voltage generating module 30, and configured to output the voltage generating signals.

For example, in the light-on control system board according to the embodiment of the present disclosure, the micro processing chip can be formed in a combination of software and hardware. That is, in the hardware of the micro processing chip, there is a program stored in advance for controlling generation of various required light-on voltages, and the program can also be triggered to start working when the light-on control system is powered on, so as to output a plurality of voltage generating signals to the voltage generating module, to output the first control signals in one-to-one correspondence with the plurality of voltage generating signals and the second control signals in one-to-one correspondence with the plurality of voltage generating signals to the transformation control module, and to generate the data voltage signal for lighting on the display panel. Moreover, for example, the structure of the microprocessor chip can be any structure that can be understood by those skilled in the art, which is not repeatedly described herein. Nor should it be construed as a limitation to the present disclosure.

For example, in the light-on control system board according to an embodiment of the present disclosure, as shown in FIG. 4b, a fourth output terminal Out_c5 of the micro processing chip MCU is correspondingly connected to the mobile industry processor interface (MIPI), and is configured to output the data voltage signal through the mobile industry processor interface (MIPI).

For example, in the light-on control system board according to the embodiment of the present disclosure, as shown in FIG. 4a and FIG. 4b, the voltage generating module 30 comprises a programmable circuit PLD.

An enabling terminal En_d1 of the programmable circuit PLD is correspondingly connected to the transformation control module, and configured to receive the enabling signals; a first input terminal In_d2 of the programmable circuit PLD is correspondingly connected to the main control module 10, and configured to receive the voltage generating signals; an output terminal Out_d3 of the programmable circuit PLD is correspondingly connected to the display panel 40, and configured to output the light-on voltages.

For example, in the light-on control system board according to the embodiment of the present disclosure, the programmable circuit can be implemented in a combination of software and hardware. That is, in the hardware of the programmable circuit, there is a program stored in advance for generating various required light-on voltages. The program can determine the values of corresponding light-on voltages under the control of the plurality of voltage generating signals, and the program can output the corresponding light-on voltages of the values being determined to the display panel under the control of a valid potential of the enabling signals. Moreover, for example, the structure of the programmable circuit can be any structure that can be understood by those skilled in the art, which is not repeatedly described herein. Nor should it be construed as a limitation to the present disclosure.

For example, in the light-on control system board according to the embodiment of the present disclosure, as shown in FIG. 4b, the voltage transformation module 50 comprises a step-down transformation circuit Buck.

An input terminal In_e1 of the step-down transformation circuit Buck is connected to a power supply terminal Vinput, and configured to receive the power supply voltage; an output terminal Out_e2 of the step-down transformation circuit Buck is respectively connected to the main control module 10, the transformation control module, and the voltage generating module 30, and configured to output the operation voltage For example, in the light-on control system board according to an embodiment of the present disclosure, the structure of the step-down transformation circuit can be any structure that can be understood by those skilled in the art, which is not repeatedly described herein. Nor should it be construed as a limitation to the present disclosure.

For example, in the light-on control system board according to the embodiment of the present disclosure, as shown in FIG. 4b, upon the main control module 10 comprising the micro processing chip MCU, an input terminal In_c4 of the micro processing chip MCU is connected to the voltage transformation module 50 and configured to receive the operation voltage. For example, the input terminal In_c4 of the micro processing chip MCU is connected to the output terminal Out_e2 of the step-down transformation circuit Buck in the voltage transformation module 50.

For example, in the light-on control system board according to the embodiment of the present disclosure, as shown in FIG. 4b, upon the transformation control module comprising the first transformation control sub-module 21 and the second transformation control sub-module 22, the reference voltage terminal Vref is connected to the voltage transformation module 50 and configured to receive the operation voltage. For example, the reference voltage terminal Vref is connected to the output terminal Out_e2 of the step-down transformation circuit Buck in the voltage transformation module 50.

For example, in the light-on control system board according to the embodiment of the present disclosure, as shown in FIG. 4b, upon the voltage generating module 30 comprising the programmable circuit PLD, a second input terminal In_d4 of the programmable circuit PLD is connected to the voltage transformation module 50 and configured to receive the operation voltage. For example, the second input terminal In_d4 of the programmable circuit PLD is connected to the output terminal Out_e2 of the step-down transformation circuit Buck in the voltage transformation module 50.

Figure 5:
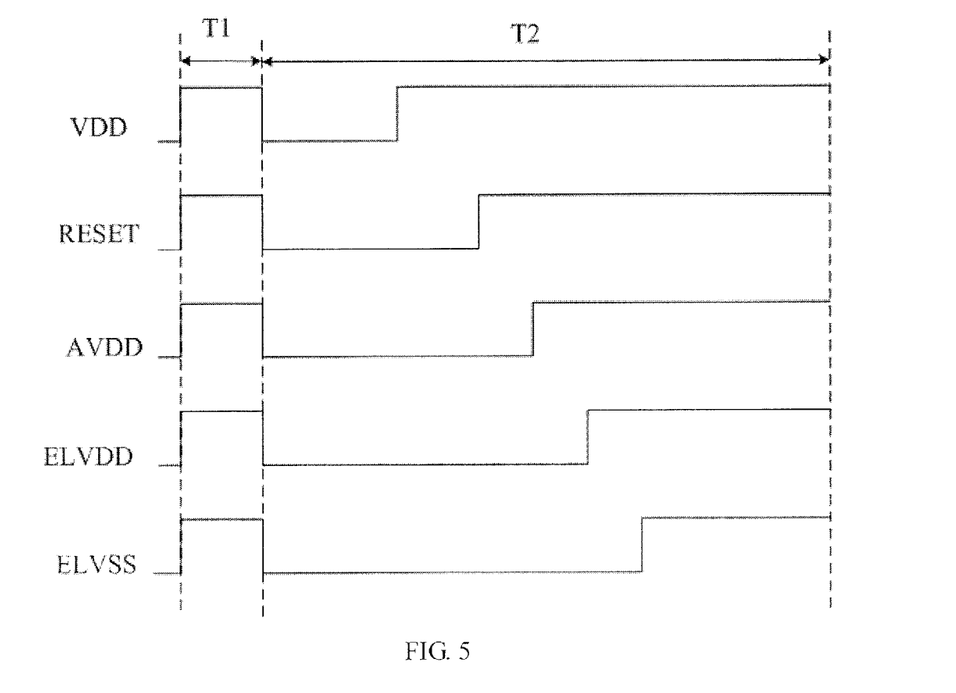
FIG. 5 is a timing diagram of light-on voltages outputted by the light-on control system board shown in FIG. 4b.

Hereinafter, taking the structure of the light-on control system board shown in FIG. 4b as an example, the operation process of the light-on control system board according to the embodiment of the present disclosure is described with reference to the timing diagram shown in FIG. 5. Moreover, the following description is illustrated by taking generating the light-on voltage IOVCC and that the preset delay time of the delay buffer Buffer1 is 200 ms as an example.

Within the period of time T1 from the beginning of power-on to the completion of power-on for the light-on control system board, the step-down transformation circuit Buck transforms the power supply voltage inputted by the power supply terminal Vinput into the operation voltage for the micro processing chip MCU in the main control module 10, the reference voltage terminal Vref connected to the delay buffer Buffer1 in the first transformation control sub-module 21 and the programmable circuit PLD in the voltage generating module 30, and outputs the operation voltage thereto, respectively.

Upon receiving the operation voltage, the micro processing chip MCU outputs a voltage generating signal corresponding to the light-on voltage IOVCC to the programmable circuit PLD, so that the programmable circuit PLD can determine the value of the light-on voltage IOVCC. The micro processing chip MCU also outputs a first control signal EN1 corresponding to the voltage generating signal to the delay buffer Buffer1 and outputs a second control signal EN2 corresponding to the voltage generating signal to the control buffer Buffer2. Because signals outputted by the micro processing chip MCU are all of a high potential during power-on, the first control signal EN1 and the second control signal EN2 are of a high potential. During the period when the first control signal EN1 is of a high potential, the delay buffer Buffer1 can delay the signal of the input terminal In_a2 thereof by 200 ms and then output the signal being delayed as a delayed signal out_a3, that is, the reference voltage signal Vref corresponding to the high potential of the first control signal EN1 is delayed by 200 ms and then is outputted as the delayed signal out_a3 to the input terminal In_b2 of the control buffer Buffer2. During the period when the second control signal EN2 is of a high potential, the control buffer Buffer2 can output the delayed signal out_a3 corresponding to the high potential of the second control signal EN2 as an enabling signal EN0 to the enabling terminal En_d1 of the programmable circuit PLD. Because the delayed signal out_a3 corresponding to the high potential of the second control signal EN2 is of a low potential, the enabling signal EN0 is of a low potential during the period when the second control signal EN2 is of a high potential, so that the enabling terminal En_d1 of the programmable circuit PLD is of a low potential. Because the enabling terminal En_d1 of the programmable circuit PLD is of a low potential, the programmable circuit PLD outputs a light-on voltage of a low potential through the mobile industry processor interface MIPI, which can prevent the programmable circuit PLD from outputting the light-on voltage having an uncontrollable timing and having a voltage value within the period of time from the beginning of power-on to the completion of power-on for the light-on control system board.

Within the period of time T2 after the completion of power-on for the light-on control system board, the first control signal EN1 and the second control signal EN2 change from a low potential to a high potential. During the period when the first control signal EN1 is of a high potential, the delay buffer Buffer1 can delay the signal of the input terminal In_a2 thereof by 200 ms and then output the signal being delayed as a delayed signal out_a3, that is, the reference voltage signal Vref corresponding to the high potential of the first control signal EN1 is delayed by 200 ms and then is outputted as the delayed signal out_a3 to the input terminal In_b2 of the control buffer Buffer2. During the period when the second control signal EN2 is of a high potential, the control buffer Buffer2 can output the delayed signal out_a3 corresponding to the high potential of the second control signal EN2 as an enabling signal EN0 to the enabling terminal En_d1 of the programmable circuit PLD, so that the enabling terminal En_d1 of the programmable circuit PLD is of a high potential. Because the enabling terminal En_d1 of the programmable circuit PLD is of a high potential, the programmable circuit PLD can output the light-on voltage IOVCC of the value being determined to the display panel through the mobile industry processor interface MIPI, so as to light on the display panel.

Figure 6:
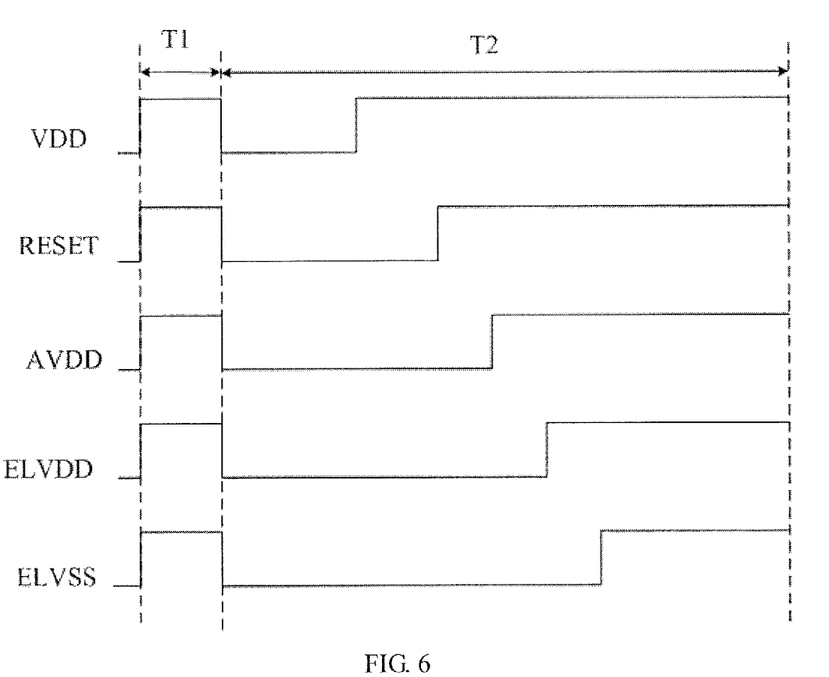
FIG. 6 is a timing diagram of light-on voltages outputted by a light-on control system board according to an embodiment of the present disclosure.

In an embodiment of the present disclosure, the programmable circuit PLD also needs to output the light-on voltages VDD, RESET, AVDD, ELVDD, ELVSS, etc. The light-on voltages VDD, RESET, AVDD, ELVDD, ELVSS outputted by the light-on control system board according to the embodiment of the present disclosure, are shown in FIG. 6, respectively. As shown in FIG. 6, within the period of time T1 from the beginning of power-on to the completion of power-on for the light-on control system board, the light-on voltages VDD, RESET, AVDD, ELVDD, ELVSS are all of a low potential; and within the period of time T2 after the completion of power-on for the light-on control system board, the light-on voltages VDD, RESET, AVDD, ELVDD and ELVSS are outputted in a predetermined timing sequence. Moreover, for each light-on voltage, an operation process thereof is basically the same as the operation process of generating the light-on voltage IOVCC described above, which is not repeatedly described herein.

In the light-on control system board according to the embodiment of the present disclosure, within the period of time from the beginning of power-on to the completion of power-on for the light-on control system board, due to the effect of the delay buffer and the control buffer, the enabling terminal of the programmable circuit PLD can be of a low potential, so as to prevent the programmable circuit PLD from outputting the light-on voltages of the values being determined and having an uncontrollable timing. Within the period of time after the completion of power-on for the light-on control system board, the programmable circuit can normally output each light-on voltage of a high potential to light on the display panel, so as to inspect the display panel, which can effectively control the light-on voltages outputted to the display panel, improve the stability of inspection of the display panel, and make the control of the light-on control system board smarter.

Figure 7:
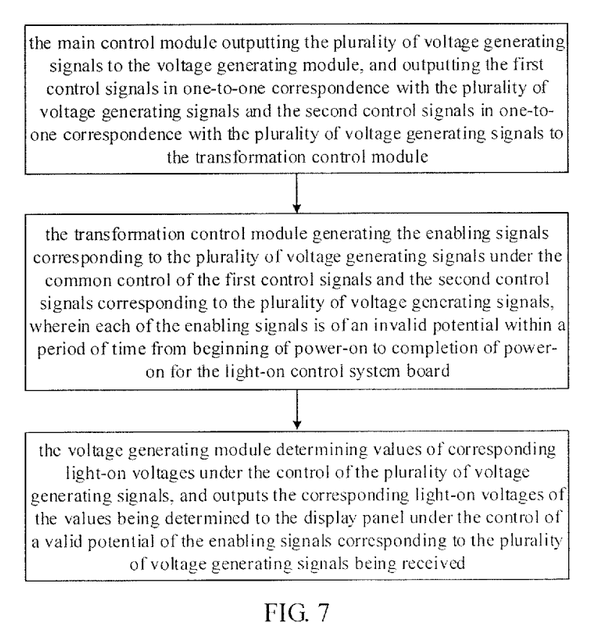
FIG. 7 is a flowchart of an inspection method according to an embodiment of the present disclosure.

At least an embodiment of the present disclosure also provides an inspection method for the light-on control system board according to any one embodiment of the present disclosure, as shown in FIG. 7, which comprises: the main control module outputting the plurality of voltage generating signals to the voltage generating module, and outputting the first control signals in one-to-one correspondence with the plurality of voltage generating signals and the second control signals in one-to-one correspondence with the plurality of voltage generating signals to the transformation control module; the transformation control module generating the enabling signals corresponding to the plurality of voltage generating signals under the common control of the first control signals and the second control signals corresponding to the plurality of voltage generating signals, wherein each of the enabling signals is of an invalid potential within a period of time from beginning of power-on to completion of power-on for the light-on control system board; the voltage generating module determining values of corresponding light-on voltages under the control of the plurality of voltage generating signals, and outputs the corresponding light-on voltages of the values being determined to the display panel under the control of a valid potential of the enabling signals corresponding to the plurality of voltage generating signals being received.

In the inspection method according to the embodiment of the present disclosure, the main control module directly outputs the plurality of voltage generating signals to the voltage generating module to control the voltage generating module to determine values of corresponding light-on voltages; each of the enabling signals inputted by the transformation control module controlled by the main control module to the voltage generating module is of an invalid potential within a period of time from beginning of power-on to completion of power-on for the light-on control system board, which can prevent the light-on control system board from outputting light-on voltages having an uncontrollable timing when the light-on control system is powered on, and can effectively control the light-on voltages outputted to the display panel, improve the stability of inspection of the display panel, and make the control of the light-on control system board smarter.

For example, in the inspection method according to the embodiment of the present disclosure, upon the transformation control module comprising first transformation control sub-modules in one-to-one correspondence with the first control signals and second transformation control sub-modules in one-to-one correspondence with the second control signals, generating the enabling signals corresponding to the plurality of voltage generating signals under the common control of the first control signals and the second control signals corresponding to the plurality of voltage generating signals, comprises: each of the first transformation control sub-modules outputting a corresponding delay signal to a corresponding second transformation control sub-module under the control of the first control signal being received; wherein the delay signal being a signal after delaying a reference voltage signal corresponding to a valid potential of the first control signal being received by a preset delay time; and each of the second transformation control sub-modules outputting the corresponding enabling signal to the voltage generating module under the control of the second control signal being received; wherein the enabling signal is a delay signal corresponding to a valid potential of the second control signal being received.

At least an embodiment of the present disclosure also provides a light-on test device, which is configured for inspection of a display panel. The light-on test device comprises the light-on control system board according to any one embodiment of the present disclosure. The operation principle of the light-on test device is similar to that of the light-on control system board mentioned above, so the implementation of the light-on test device can be referred to the implementation of the light-on control system board mentioned above, which is not repeatedly described herein. Other indispensable components of the light-on test device should be understood by those skilled in the art, which is not repeatedly described herein. Nor should it be construed as a limitation to the present disclosure.

The light-on control system board according to the embodiment of the present disclosure comprises: the main control module, the transformation control module and the voltage generating module; wherein the main control module outputs the plurality of voltage generating signals to the voltage generating module to control the voltage generating module to determine values of corresponding light-on voltages, that is, the main control module inputs the plurality of voltage generating signals directly to the voltage generating module to control the voltage generating module to determine values of corresponding light-on voltages. The main control module outputs the first control signals in one-to-one correspondence with the plurality of voltage generating signals and the second control signals in one-to-one correspondence with the plurality of voltage generating signals to the transformation control module, the transformation control module generates the enabling signals corresponding to the plurality of voltage generating signals under the common control of the first control signals and the second control signals which are received and correspond to the plurality of voltage generating signals, and outputs the enabling signals being generated to the voltage generating module, wherein each of the enabling signals being generated is of an invalid potential within a period of time from beginning of power-on to completion of power-on for the light-on control system board, so that the voltage generating module has no output under the control of an invalid potential of the enabling signals, and the voltage generating module outputs the corresponding light-on voltages of the values being determined under the control of a valid potential of the enabling signals. Therefore, each of the enabling signals inputted by the transformation control module controlled by the main control module to the voltage generating module is of an invalid potential within a period of time from beginning of power-on to completion of power-on for the light-on control system board, which can prevent the light-on control system board from outputting light-on voltages having an uncontrollable timing when the light-on control system is powered on, and can effectively control the light-on voltages outputted to the display panel, improve the stability of inspection of the display panel, and make the control of the light-on control system board smarter.

What have been described above are only specific implementations of the present disclosure, the protection scope of the present disclosure is not limited thereto. Therefore, the protection scope of the present disclosure should be based on the protection scope of the claims.

What is claimed is:

1. A light-on control system board, applied in a light-on test device for inspection of a display panel, comprising: a main control circuit, a transformation control circuit and a voltage generating circuit, wherein
    the main control circuit is configured to output a plurality of voltage generating signals to the voltage generating circuit, and output first control signals in one-to-one correspondence with the plurality of voltage generating signals and second control signals in one-to-one correspondence with the plurality of voltage generating signals to the transformation control circuit;
    the transformation control circuit is configured to generate enabling signals corresponding to the plurality of voltage generating signals under common control of the first control signals and the second control signals which are received and correspond to the plurality of voltage generating signals, and output the enabling signals being generated to the voltage generating circuit, wherein each of the enabling signals is of an invalid potential within a period of time from beginning of power-on to completion of power-on for the light-on control system board; and
    the voltage generating circuit is configured to determine values of corresponding light-on voltages under the control of the plurality of voltage generating signals being received, and output the corresponding light-on voltages of the values being determined to the display panel under the control of a valid potential of the enabling signals corresponding to the plurality of voltage generating signals being received.

2. The light-on control system board according to claim 1, wherein the transformation control circuit comprises: first transformation control sub-circuits in one-to-one correspondence with the first control signals and second transformation control sub-circuits in one-to-one correspondence with the second control signals; wherein
    a first terminal of each of the first transformation control sub-circuits is correspondingly connected to the main control circuit, and configured to receive a corresponding first control signal; a second terminal of each of the first transformation control sub-circuits is connected to a reference voltage terminal, and configured to receive a reference voltage signal; an output terminal of each of the first transformation control sub-circuits is connected to a second terminal of a corresponding second transformation control sub-circuit; each of the first transformation control sub-circuits is configured to output a corresponding delay signal to the corresponding second transformation control sub-circuit under the control of the first control signal being received; the delay signal is a signal after delaying the reference voltage signal corresponding to a valid potential of the first control signal being received by a preset delay time;
    a first terminal of each of the second transformation control sub-circuits is correspondingly connected to the main control circuit, and configured to receive a corresponding second control signal; an output terminal of each of the second transformation control sub-circuits is correspondingly connected to the voltage generating circuit, and configured to output a corresponding enabling signal; each of the second transformation control sub-circuits is configured to receive the corresponding second control signal and the corresponding delay signal, and output the corresponding enabling signal to the voltage generating circuit under the control of the second control signal being received; the enabling signal is a delay signal corresponding to a valid potential of the second control signal being received.

3. The light-on control system board according to claim 2, wherein each of the first transformation control sub-circuits comprises a delay buffer, the preset delay time is a delay time of the delay buffer, an enabling terminal of the delay buffer serves as the first terminal of each of the first transformation control sub-circuits, an input terminal of the delay buffer serves as the second terminal of each of the first transformation control sub-circuits, an output terminal of the delay buffer serves as the output terminal of each of the first transformation control sub-circuits.

4. The light-on control system board according to claim 2, wherein each of the second transformation control sub-circuits comprises a control buffer, an enabling terminal of the control buffer serves as the first terminal of each of the second transformation control sub-circuits, an input terminal of the control buffer serves as the second terminal of each of the second transformation control sub-circuits, an output terminal of the control buffer serves as the output terminal of each of the second transformation control sub-circuits.

5. The light-on control system board according to claim 1, wherein the main control circuit comprises a micro processing chip;
    a first output terminal of the micro processing chip is correspondingly connected to the transformation control circuit, and configured to output the first control signals; a second output terminal of the micro processing chip is correspondingly connected to the transformation control circuit, and configured to output the second control signals; a third output terminal of the micro processing chip is correspondingly connected to the voltage generating circuit, and configured to output the voltage generating signals.

6. The light-on control system board according to claim 1, wherein the voltage generating circuit comprises a programmable circuit;
an enabling terminal of the programmable circuit is correspondingly connected to the transformation control circuit, and configured to receive the enabling signals; a first input terminal of the programmable circuit is correspondingly connected to the main control circuit, and configured to receive the voltage generating signals; an output terminal of the programmable circuit is correspondingly connected to the display panel, and configured to output the light-on voltages.

7. The light-on control system board according to claim 2, wherein the light-on control system board further comprises: a voltage transformation circuit;
the voltage transformation circuit is configured to transform a power supply voltage into an operation voltage for the main control circuit, the transformation control circuit and the voltage generating circuit, and output the operation voltage;
the main control circuit, the transformation control circuit, and the voltage generating circuit are further configured to receive the operation voltage.

8. The light-on control system board according to claim 7, wherein the voltage transformation circuit comprises a step-down transformation circuit;
an input terminal of the step-down transformation circuit is connected to a power supply terminal, and configured to receive the power supply voltage; an output terminal of the step-down transformation circuit is respectively connected to the main control circuit, the transformation control circuit, and the voltage generating circuit, and configured to output the operation voltage.

9. The light-on control system board according to claim 7, wherein, upon the main control circuit comprising a micro processing chip, an input terminal of the micro processing chip is connected to the voltage transformation circuit, and configured to receive the operation voltage; or,
upon the transformation control circuit comprising a first transformation control sub-circuit and a second transformation control sub-circuit, the reference voltage terminal is connected to the voltage transformation circuit, and configured to receive the operation voltage; or,
upon the voltage generating circuit comprising a programmable circuit, a second input terminal of the programmable circuit is connected to the voltage transformation circuit, and configured to receive the operation voltage.

10. The light-on control system board according to claim 1, wherein the main control circuit is further configured to generate a data voltage signal for lighting on the display panel, and output the data voltage signal being generated to the display panel through a mobile industry processor interface.

11. The light-on control system board according to claim 1, wherein the main control circuit outputs the first control signals and the second control signals through an input/output interface.

12. The light-on control system board according to claim 1, wherein the main control circuit outputs the voltage generating signals through a serial peripheral interface or a serial communication bus.

13. A light-on test device, comprising the light-on control system board according to claim 1.

14. An inspection method for the light-on control system board according to claim 1, comprising:
the main control circuit outputting the plurality of voltage generating signals to the voltage generating circuit, and outputting the first control signals in one-to-one correspondence with the plurality of voltage generating signals and the second control signals in one-to-one correspondence with the plurality of voltage generating signals to the transformation control circuit;
the transformation control circuit generating the enabling signals corresponding to the plurality of voltage generating signals under the common control of the first control signals and the second control signals corresponding to the plurality of voltage generating signals, wherein each of the enabling signals is of an invalid potential within a period of time from beginning of power-on to completion of power-on for the light-on control system board;
the voltage generating circuit determining values of corresponding light-on voltages under the control of the plurality of voltage generating signals, and outputs the corresponding light-on voltages of the values being determined to the display panel under the control of a valid potential of the enabling signals corresponding to the plurality of voltage generating signals being received.

15. The inspection method according to claim 14, wherein, upon the transformation control circuit comprising first transformation control sub-circuits in one-to-one correspondence with the first control signals and second transformation control sub-circuits in one-to-one correspondence with the second control signals, generating the enabling signals corresponding to the plurality of voltage generating signals under the common control of the first control signals and the second control signals corresponding to the plurality of voltage generating signals, comprises:
each of the first transformation control sub-circuits outputting a corresponding delay signal to a corresponding second transformation control sub-circuit under the control of the first control signal being received, the delay signal being a signal after delaying a reference voltage signal corresponding to a valid potential of the first control signal being received by a preset delay time;
each of the second transformation control sub-circuits outputting the corresponding enabling signal to the voltage generating circuit under the control of the second control signal being received; the enabling signal is a delay signal corresponding to a valid potential of the second control signal being received.

16. The light-on control system board according to claim 3, wherein the light-on control system board further comprises: a voltage transformation circuit;
the voltage transformation circuit is configured to transform a power supply voltage into an operation voltage for the main control circuit, the transformation control circuit and the voltage generating circuit, and output the operation voltage;
the main control circuit, the transformation control circuit, and the voltage generating circuit are further configured to receive the operation voltage.

17. The light-on control system board according to claim 2, wherein the main control circuit is further configured to generate a data voltage signal for lighting on the display panel, and output the data voltage signal being generated to the display panel through a mobile industry processor interface.

18. The light-on control system board according to claim 2, wherein the main control circuit outputs the first control signals and the second control signals through an input/output interface.

19. The light-on test device according to claim 13, wherein the transformation control circuit comprises: first transformation control sub-circuits in one-to-one correspondence with the first control signals and second transformation control sub-circuits in one-to-one correspondence with the second control signals; wherein a first terminal of each of the first transformation control sub-circuits is correspondingly connected to the main control circuit, and configured to receive a corresponding first control signal; a second terminal of each of the first transformation control sub-circuits is connected to a reference voltage terminal, and configured to receive a reference voltage signal; an output terminal of each of the first transformation control sub-circuits is connected to a second terminal of a corresponding second transformation control sub-circuit; each of the first transformation control sub-circuits is configured to output a corresponding delay signal to the corresponding second transformation control sub-circuit under the control of the first control signal being received; the delay signal is a signal after delaying the reference voltage signal corresponding to a valid potential of the first control signal being received by a preset delay time;

a first terminal of each of the second transformation control sub-circuits is correspondingly connected to the main control circuit, and configured to receive a corresponding second control signal; an output terminal of each of the second transformation control sub-circuits is correspondingly connected to the voltage generating circuit, and configured to output a corresponding enabling signal; each of the second transformation control sub-circuits is configured to receive the corresponding second control signal and the corresponding delay signal, and output the corresponding enabling signal to the voltage generating circuit under the control of the second control signal being received; the enabling signal is a delay signal corresponding to a valid potential of the second control signal being received.

20. The light-on test device according to claim 19, wherein each of the first transformation control sub-circuits comprises a delay buffer, the preset delay time is a delay time of the delay buffer, an enabling terminal of the delay buffer serves as the first terminal of each of the first transformation control sub-circuits, an input terminal of the delay buffer serves as the second terminal of each of the first transformation control sub-circuits, an output terminal of the delay buffer serves as the output terminal of each of the first transformation control sub-circuits.

* * * * *